US012297086B2

(12) United States Patent
Maghsoodi

(10) Patent No.: US 12,297,086 B2
(45) Date of Patent: May 13, 2025

(54) CABLE FOLLOWER LIFTING LEVER

(71) Applicant: Hornet AcquistionCo, LLC, Vancouver, WA (US)

(72) Inventor: Bejan Maghsoodi, San Dimas, CA (US)

(73) Assignee: HORNET ACQUISITIONCO, LLC, Vancouver, WA (US)

(*) Notice: Subject to any disclaimer, the term of this patent is extended or adjusted under 35 U.S.C. 154(b) by 278 days.

(21) Appl. No.: 17/991,760

(22) Filed: Nov. 21, 2022

(65) Prior Publication Data
US 2024/0166480 A1 May 23, 2024

(51) Int. Cl.
B66D 3/26 (2006.01)
B64D 1/22 (2006.01)

(52) U.S. Cl.
CPC ............... B66D 3/26 (2013.01); B64D 1/22 (2013.01); B66D 2700/026 (2013.01)

(58) Field of Classification Search
CPC . B66D 1/28; B66D 1/36; B66D 1/365; B66D 1/38; B66D 1/7415; B66D 1/7489; B66D 2700/0191; B66D 2700/0183; B66D 2700/026; B66D 3/04; B66D 3/26; B65H 57/14; B65H 59/22; B65H 75/4415
USPC ........................................................ 254/335
See application file for complete search history.

(56) References Cited

U.S. PATENT DOCUMENTS 4,013,270 A * 3/1977 Laky .................... B66D 1/28
254/269
4,057,202 A 11/1977 Carr, Jr.
4,058,294 A * 11/1977 Dressler ............... B66D 1/7415
254/378
4,706,940 A * 11/1987 Harig .................... B66D 1/7415
254/374
5,129,626 A * 7/1992 Koludzki ............. B66D 1/7415
254/333
5,762,282 A * 6/1998 Wolner ................ B66D 1/7415
242/390.8
7,527,243 B2 * 5/2009 Blasek .................... B66B 9/187
254/371
9,382,103 B2 * 7/2016 Seow ....................... B66D 1/36
10,669,138 B2 * 6/2020 Baugh .................. B66D 1/7405
(Continued)

FOREIGN PATENT DOCUMENTS

DE 20007855 U1 * 11/2000 ........... B66D 1/7415
DE 202005020694 6/2006
(Continued)

OTHER PUBLICATIONS

European Patent Office, European Search Report dated Apr. 8, 2024 in Application No. 23210313.5.

Primary Examiner — Emmanuel M Marcelo
Assistant Examiner — Henrix Soto
(74) Attorney, Agent, or Firm — SNELL & WILMER L.L.P.

(57) ABSTRACT

A cable follower is disclosed herein. The cable follower includes a lever having a first end and a second end, a pivot point disposed at the first end of the lever, the lever configured to rotate about the pivot point, a spring housing disposed at the second end of the lever, a spring disposed in the spring housing, a button disposed in the spring housing and adjacent the spring, and a crowder coupled to the lever at a pivot point between the first end and the second of the lever, the crowder including a wheel.

15 Claims, 7 Drawing Sheets

(56) References Cited

U.S. PATENT DOCUMENTS

| | | |
|---|---|---|
| 10,723,602 B2 | 7/2020 | Maghsoodi |
| 2013/0200318 A1* | 8/2013 | Asensio Bazterra ........................ B66D 1/7489 254/295 |
| 2019/0023541 A1 | 1/2019 | Ziebell |
| 2022/0193461 A1* | 6/2022 | Boulliat ................... B66D 3/20 |

FOREIGN PATENT DOCUMENTS

| | | | |
|---|---|---|---|
| EP | 0363800 | | 4/1990 |
| KR | 0155257 B1 * | | 2/1999 |
| KR | 100240746 B1 * | | 3/2000 |
| WO | 20090072992 | | 6/2009 |
| WO | WO-2015156695 A1 * | 10/2015 | ........... B66D 1/7489 |

* cited by examiner

CABLE FOLLOWER LIFTING LEVER

FIELD

The present disclosure generally relates cable hoists, and more particularly to a rescue hoist assembly having a cable follower lifting lever.

BACKGROUND

Hoist and winches are commonly used on aircrafts and ships to haul, pull, raise, and lower heavy loads using a cable. A cable follower may be used within the hoist or winch to so that the cable winds and unwinds properly regardless of whether or not there is a load on the cable. Generally, the cable follower is removed from the hoist to perform maintenance and repairs, such as replacing the cable. Removing the cable follower typically takes time, effort, and tools.

SUMMARY

A cable follower is disclosed herein. The cable follower includes a lever having a first end and a second end, a pivot point disposed at the first end of the lever, the lever configured to rotate about the pivot point, a spring housing disposed at the second end of the lever, a spring disposed in the spring housing, a button disposed in the spring housing and adjacent the spring, and a crowder coupled to the lever at a pivot point between the first end and the second of the lever, the crowder including a wheel.

In various embodiments, the spring is configured to apply a first force on the lever, the first force acting a first direction, and the crowder is configured to apply a second force in a second direction, the second direction being opposite the first direction. In various embodiments, the second force is greater than the first force. In various embodiments, the cable follower further includes a pin configured to extend through a pin hole in the spring housing. In various embodiments, the button is configured to compress the spring and the pin, when inserted through the pin hole, is configured to secure the spring in a compressed state.

In various embodiments, the cable follower further includes a catch disposed at the first end of the lever, the catch configured to support the lever in an open position. In various embodiments, the lever includes a bend. In various embodiments, the spring is further disposed within the button.

Also disclosed herein is a hoist system including a hoist body, a cable drum disposed within the hoist body, a pulley disposed adjacent the cable drum, a cable disposed around the cable drum and the pulley, the cable configured to extend from the cable drum and over the pulley, the cable configured to retract over the pulley and onto the cable drum, and a cable follower coupled to the hoist body. The cable follower includes a member having a first end and a second end, a first pivot point disposed at the first end of the member, a spring coupled to the member, a button coupled to the member and contacting the spring, and a crowder coupled to the member at a third point between a first point and the second point, the crowder configured to apply a first force to the cable.

In various embodiments, the cable follower further includes a spring housing coupled to the first end of the member, wherein the spring is coupled to the spring housing and the button is coupled to the spring housing. In various embodiments, the hoist system further includes a first pin hole in the hoist body, a second pin hole in the spring housing, wherein the first pin hole and the second pin hole are aligned when the cable follower is in a closed position, and a pin configured to extend through the first pin hole and the second pin hole to secure the cable follower in the closed position.

In various embodiments, the button is configured to compress the spring in response to being pressed, and wherein the pin is configured to secure the spring in a compressed stated. In various embodiments, the hoist system further includes a third pin hole in the hoist body adjacent the first end of the member and a catch coupled to the member, wherein the pin is configured to be inserted through the third pin hole and engage to the catch to support the cable follower in an open position. In various embodiments, the catch extends perpendicular from the member into the hoist body. In various embodiments, the spring is configured to apply a second force to the member, the second force being less than the first force.

In various embodiments, the crowder includes a wheel configured to engage the cable. In various embodiments, the member includes a first portion extending in a first direction and a second portion extending in a second direction that is different than the first direction. In various embodiments, the cable follower is configured to rotate with respect to the hoist body about the first pivot point to an open position such that the cable is accessible within the hoist body.

Also disclosed herein is a method of using a cable follower with a hoist. The method including closing the cable follower, the cable follower including a crowder, a spring, and a button, the cable follower engaging a cable within the hoist in response to being closed, depressing the button, the button compressing the spring, and inserting a pin through a first hole in the cable follower and a second hole in the hoist, the pin securing the compressed spring.

In various embodiments, the method further includes depressing the button, the button compressing the spring, removing the pin from the first hole, releasing the cable follower from the hoist, and raising the cable follower to access the hoist.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is a cable follower for use with a hoist or winch that allows for quicker access to the hoist for cable changes without the use of tools. In various embodiments, the cable follower may include a lever pivotally connected to the body of the hoist. In various embodiments, the lever may include roller wheels coupled to the lever. In various embodiments, a spring may be coupled to the lever, providing a force to push the roller wheels against the cable. In various embodiments, the spring may be small, or light, spring that is loaded through the use of a push button. In various embodiments, the spring and lever may combine to provide a mechanical advantage so that the roller wheels provide more force against the cable than is provided by the spring. In various embodiments, the lever may be rotated out of position without the use of tools to provide quick access to the cable within the hoist.

Figure 1:
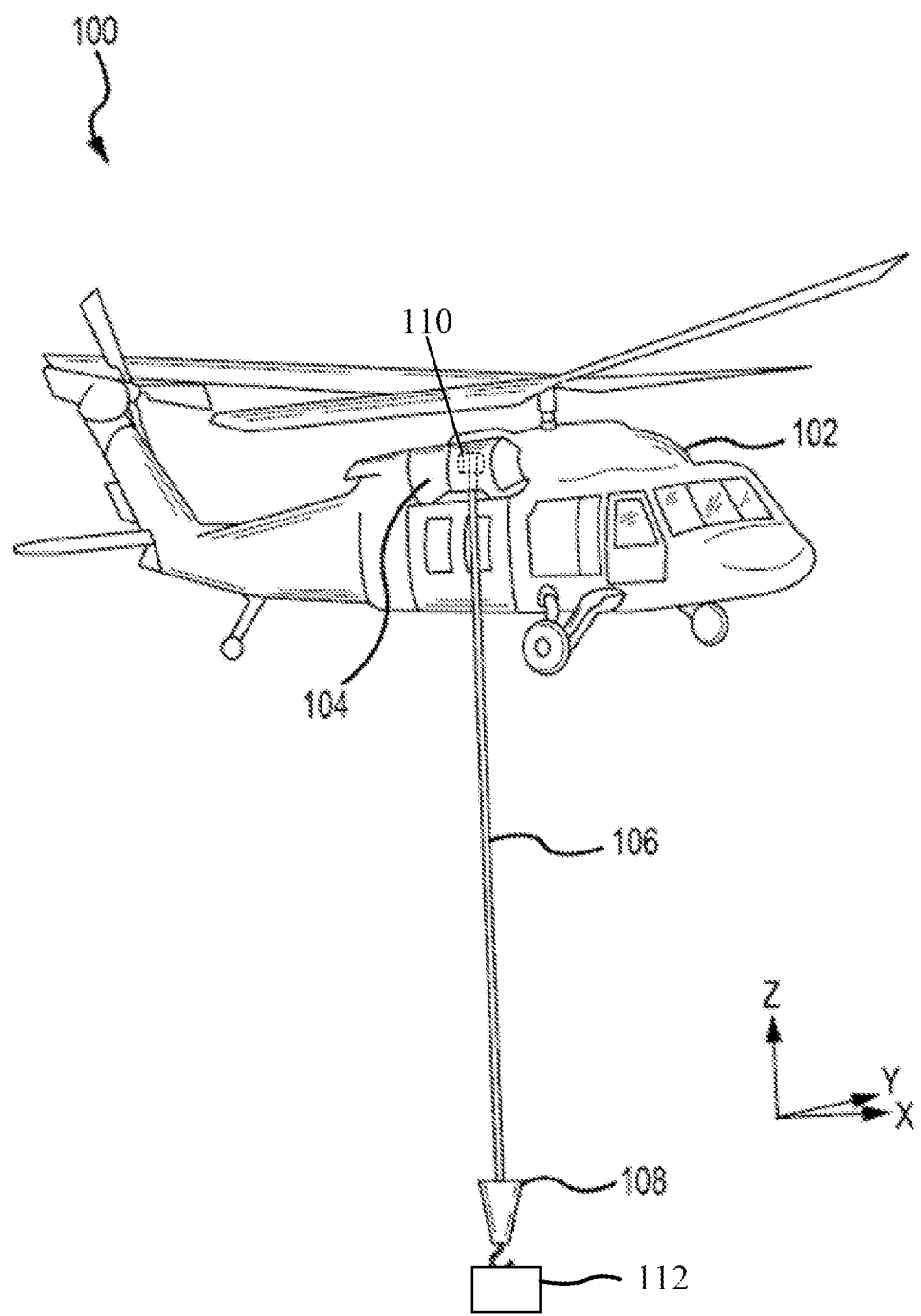
FIG. 1 illustrates a hoist assembly, hook assembly, and cable follower, in accordance with various embodiments.

Referring now to FIG. 1, a hoist system 100 is shown, in accordance with various embodiments. Hoist system 100 includes a hoist assembly 104. Hoist assembly 104 may be coupled directly to an airframe 102 or mechanically coupled to a boom that is mechanically coupled to airframe 102. Hoist assembly houses a cable 106 that may be released and retracted. Cable 106 includes a first end coupled the hoist assembly 104 and a second end. Hoist assembly may house a drum 110 about which cable 106 may be wound. Hoist assembly may release cable 106 (e.g., in the negative Z direction) by rotating drum 110 in a first direction (e.g., clockwise) and retract cable 106 (e.g., in the Z direction) by rotating drum 110 in a second direction (e.g., counter-clockwise) that is opposite the first direction. Cable 106 may thus hang at various distances from hoist assembly 104 and airframe 102. In various embodiments, a hook assembly 108 may be coupled to the second cable 106, opposite hoist assembly 104. A load 112 may be coupled to hook assembly 108 and hang from hoist assembly 104 on cable 106. In various embodiments, load 112 may be coupled directly to cable 106.

Figure 2A:
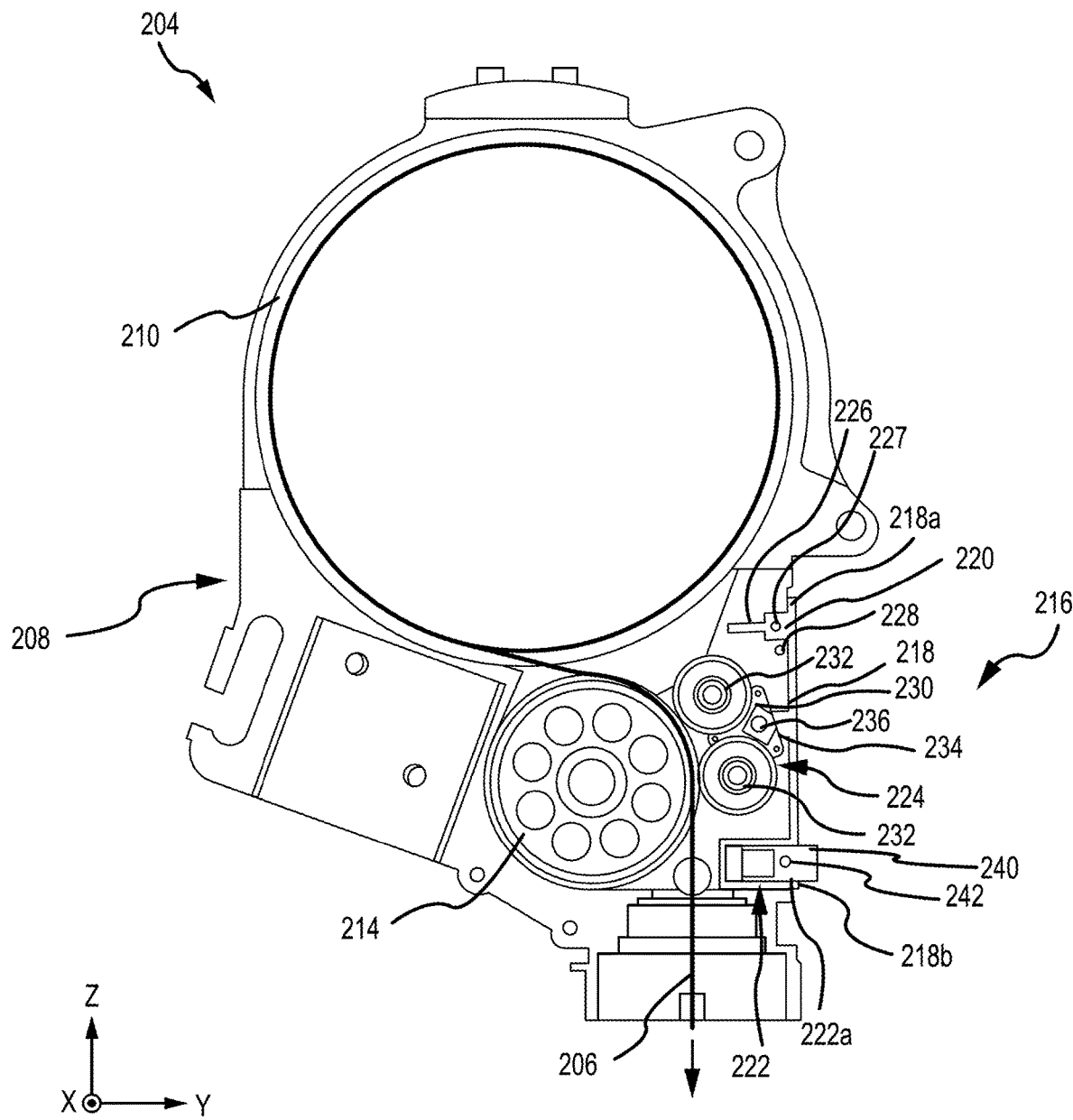
FIGS. 2A and 2B illustrate a cable follower assembly for use with a hoist, in accordance with various embodiments.
Figure 2B:
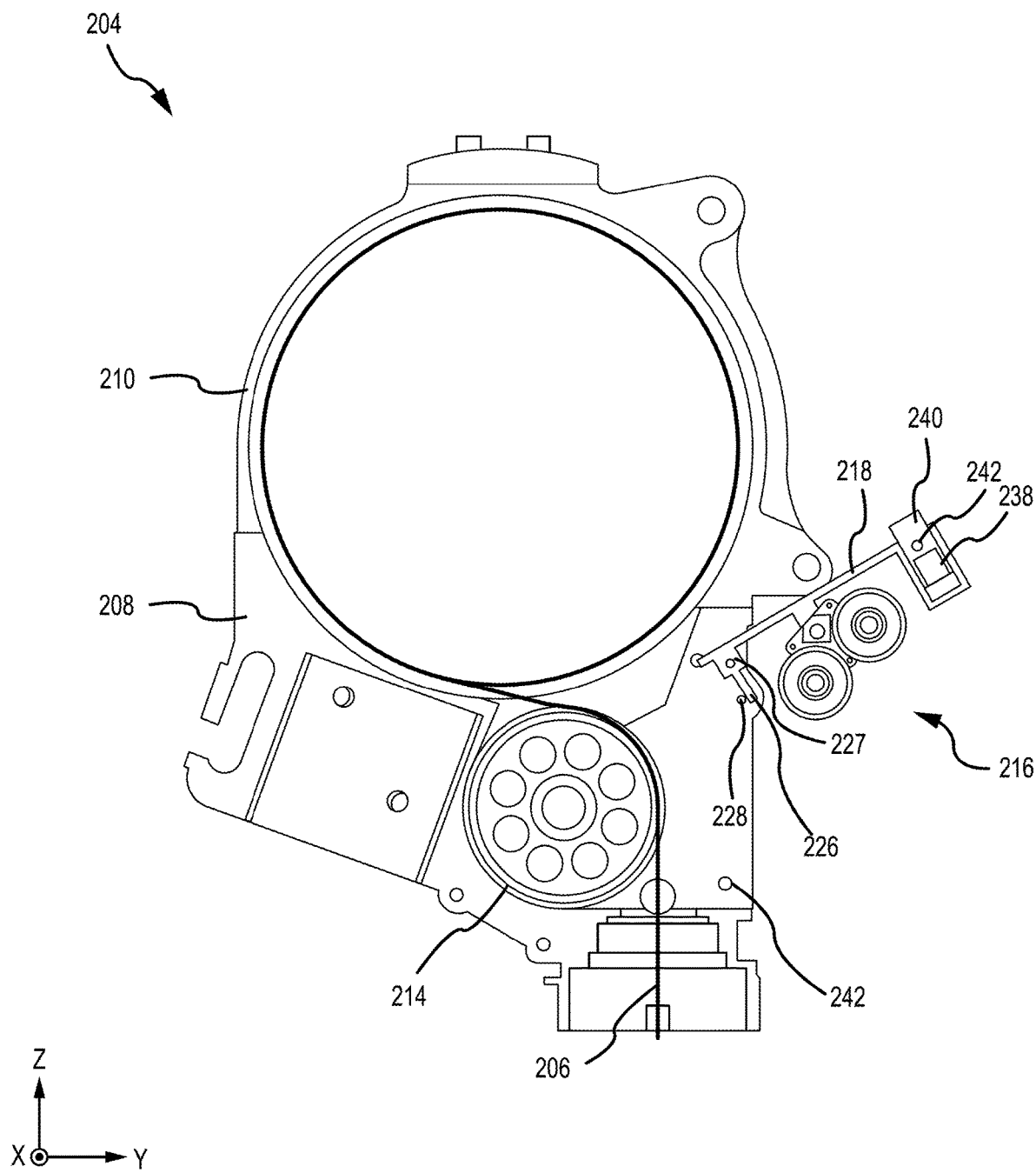

Referring now to FIGS. 2A and 2B, side views of a hoist assembly 204 are illustrated in accordance with various embodiments. In various embodiments, hoist assembly 204 may be an example of hoist assembly 104 described above with respect to FIG. 1. Hoist assembly 204 includes a housing 208, a drum 210, a pulley 214, and a cable follower 216. FIG. 2A illustrates hoist assembly 204 with cable follower 216 in a closed position. FIG. 2B illustrates hoist assembly 204 with cable follower 216 in an open position. A cable 206 is wound around drum 210 within housing 208. As drum 210 rotates in a first direction (e.g., counterclockwise) cable 206 is released, or unwound, from drum 210 and over pulley 214 to exit housing 208 (e.g., in the negative Z direction). As drum 210 rotates in a second direction (e.g., clockwise) cable 206 is retracted (e.g., in the Z direction) over pulley 214 and wound around drum 210. Cable follower 216 applies a pressure on cable 206 as it is released and retracted to provide resistance to the movement of cable 206 to ensure hoist assembly 204 operates correctly. As mentioned above with respect to FIG. 1, cable 206 may or may not carry a load (e.g., load 112). The load, when having sufficient mass, provides resistance to cable 206 during release and retraction. When the load is not present, cable follower 216 provides resistance as if the load were present.

Cable follower 216 includes a lever 218, a pivot 220, a spring housing 222, and a crowder 224. Lever 218 has a first end 218a and a second end 218b. Pivot 220 is disposed at the first end 218a of lever 218 and spring housing 222 is disposed at the second end 218b of lever 218. Pivot 220 may include a catch 226 and a pivot pin 227 that is disposed within catch 226. Cable follower 216 may rotate about pivot pin 227 from a closed position, as illustrated in FIG. 2A, to an open position, as illustrated in FIG. 2B. Catch 226 may extend perpendicular to lever 218 and into housing 208 (e.g., the negative Y direction). Catch 226 may be used to support lever 218 while cable follower 216 is in an open position, as illustrated in FIG. 2B. A pin hole 228 may be disposed in housing 208 and below catch 226 (e.g., the negative Z direction). Pin hole 228 may be configured to receive a pin to support cable follower 216, and more specifically catch 226, when cable follower is in the open position.

Crowder 224 may be disposed near a midpoint of lever 218, between first end 218a and second end 218b. In various embodiments, crowder 224 may be disposed at any suitable position between first end 218a and second end 218b. Crowder 224 may include a pivot housing 230 and one or more roller wheels 232. Crowder 224, and more specifically, pivot housing 230 may be connected to lever 218 at a connection member 234 that extends perpendicular to lever 218 (e.g., in the negative Y direction). Pivot housing 230 may include a second pivot hole 236 that is configured to receive a pin to connect pivot housing 230 to connection member 234. The pin allows pivot housing 230 to pivot with respect to lever 218. The one or more roller wheels 232 are connected to pivot housing 230. In various embodiments, roller wheels 232 may be connected to pivot housing 230 by a pin and/or a bearing, among other means. When cable follower 216 is in the closed position, roller wheels 232 are configured to engage cable 206 and pulley 214 as pulley 214 rotates, either extending or retracting cable 206. Roller wheels 232 and pivot housing 230 may pivot as roller wheels 232 come into contact with pulley 214 and cable 206. When cable follower 216 is in the open position, roller wheels 232 do not contact cable 206 or pulley 214, allowing access to cable 206 and pulley 214.

Spring housing 222 further includes a spring 238 and a button 240, including a pin hole 242. Spring housing 222 may include sidewalls 222a extending perpendicular from lever 218 and into housing 208 (e.g., the negative Y direction). Spring housing 222 may further include a bottom wall 222b extending between sidewalls 222a and sized to receive spring 238. Spring 238 may be located within spring housing 222, between sidewalls 222a and contacting bottom wall 222b at a first end of spring 238. button 240 may be contacting a second end of spring 238 opposite the first end (e.g., bottom wall 222b). A pin may be placed through pin hole 242 to secure spring housing 222 to housing 208. Pin hole 242 may extend through a portion of housing 208 and sidewalls 222a of spring housing 222 allowing the pin to be inserted and removed. In various embodiments, spring 238 may be disposed within button 240.

In various embodiments, button 240 may include multiple colors to indicate whether or not spring 238 is loaded. For example, button 240 may include a face having a first color (e.g., black), where the face is pointed away from spring 238, and a perimeter having a second color (e.g., red). The red perimeter of button 240 may show in response to spring 238 not being preloaded, indicating that the cable follower 216 is not ready to be used. The red perimeter of button 240 may be hidden by sidewalls 222a of spring housing 222 and the black face of button 240 may be showing in response to button 240 being depressed and secured, indicating that cable follower 216 is ready for use.

In various embodiments, spring 238 may be sized differently based on the size of lever 218 and the distance between spring 238 and crowder 224. In various embodiments, a ratio of force exerted by crowder 224 on pulley 214 to spring force of spring 238 may be 3:1. That is, spring 238 may have about 10 lbs. (about 4.54 kilograms) of spring force exerting about 30 lbs. (about 13.61 kilograms) of force on pulley 214 by crowder 224, where about means+/−2 lbs. (0.91 kilogram). In various embodiments, about 15 lbs. (about 6.80 kilograms) of force per roller wheel 232 may be exerted on pulley 214 by crowder in a two-wheel configuration.

Figure 3A:
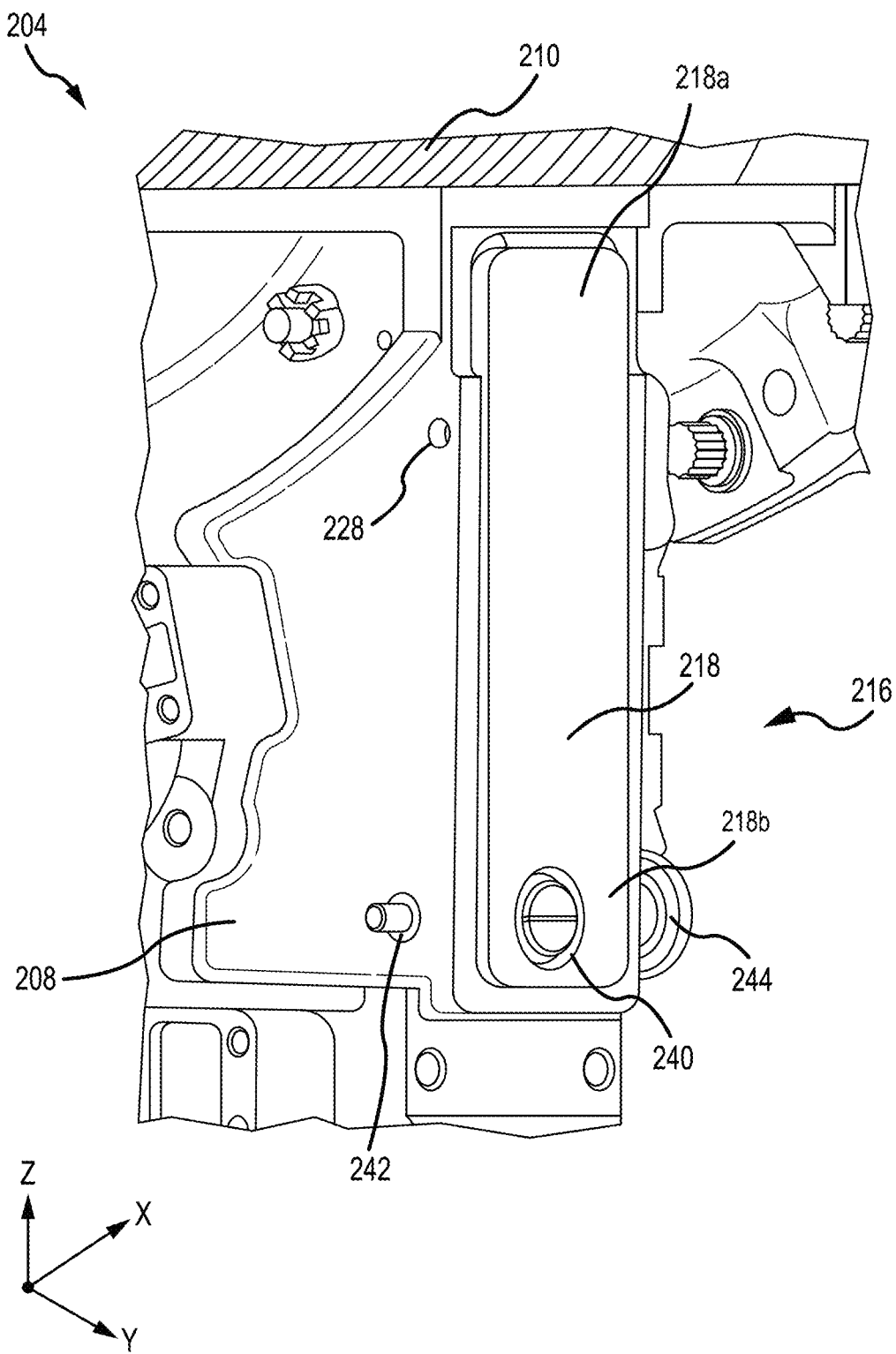
FIGS. 3A, 3B, and 3C illustrate a cable follower assembly for use with a hoist, in accordance with various embodiments.
Figure 3B:
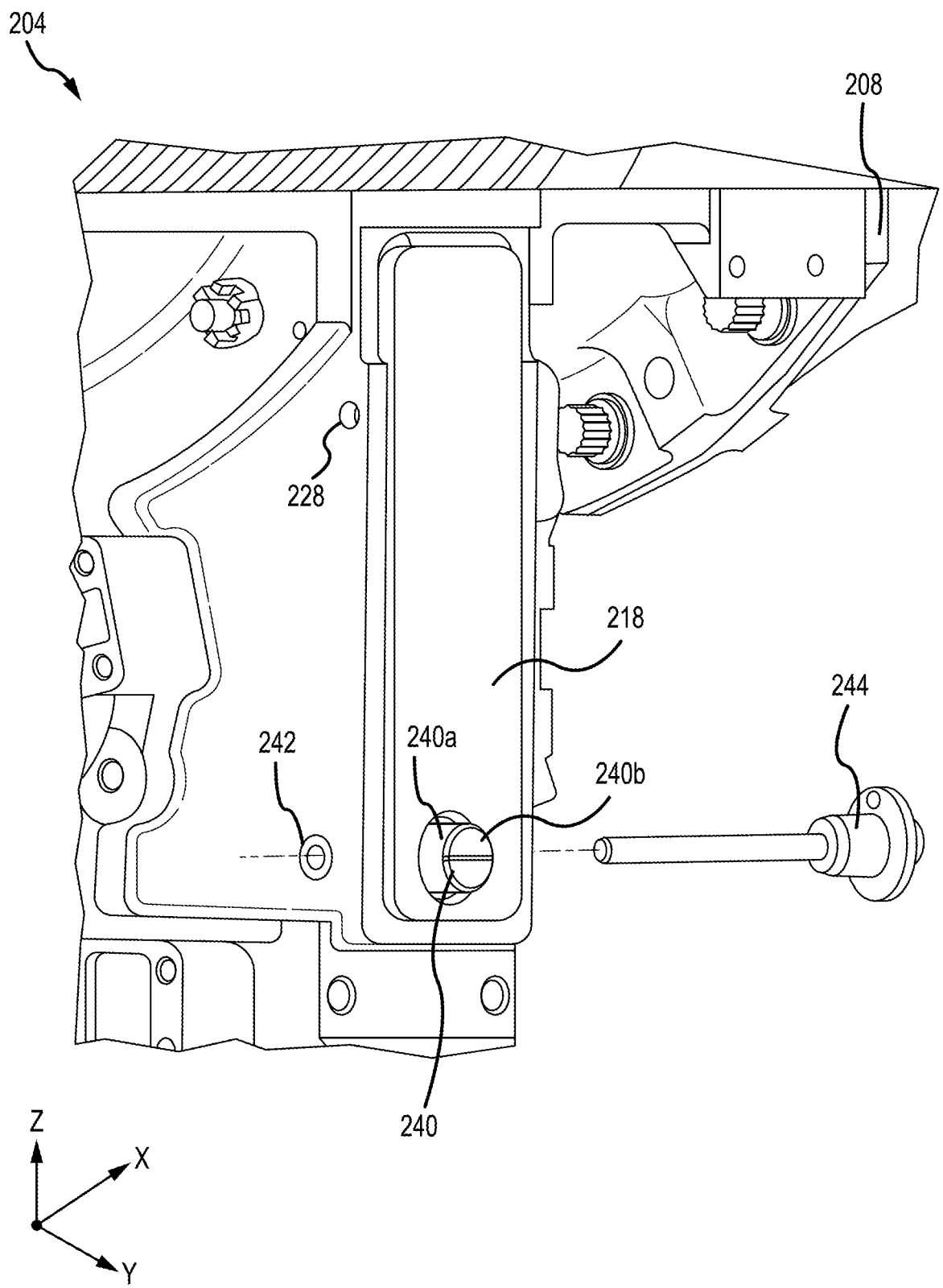
Figure 3C:
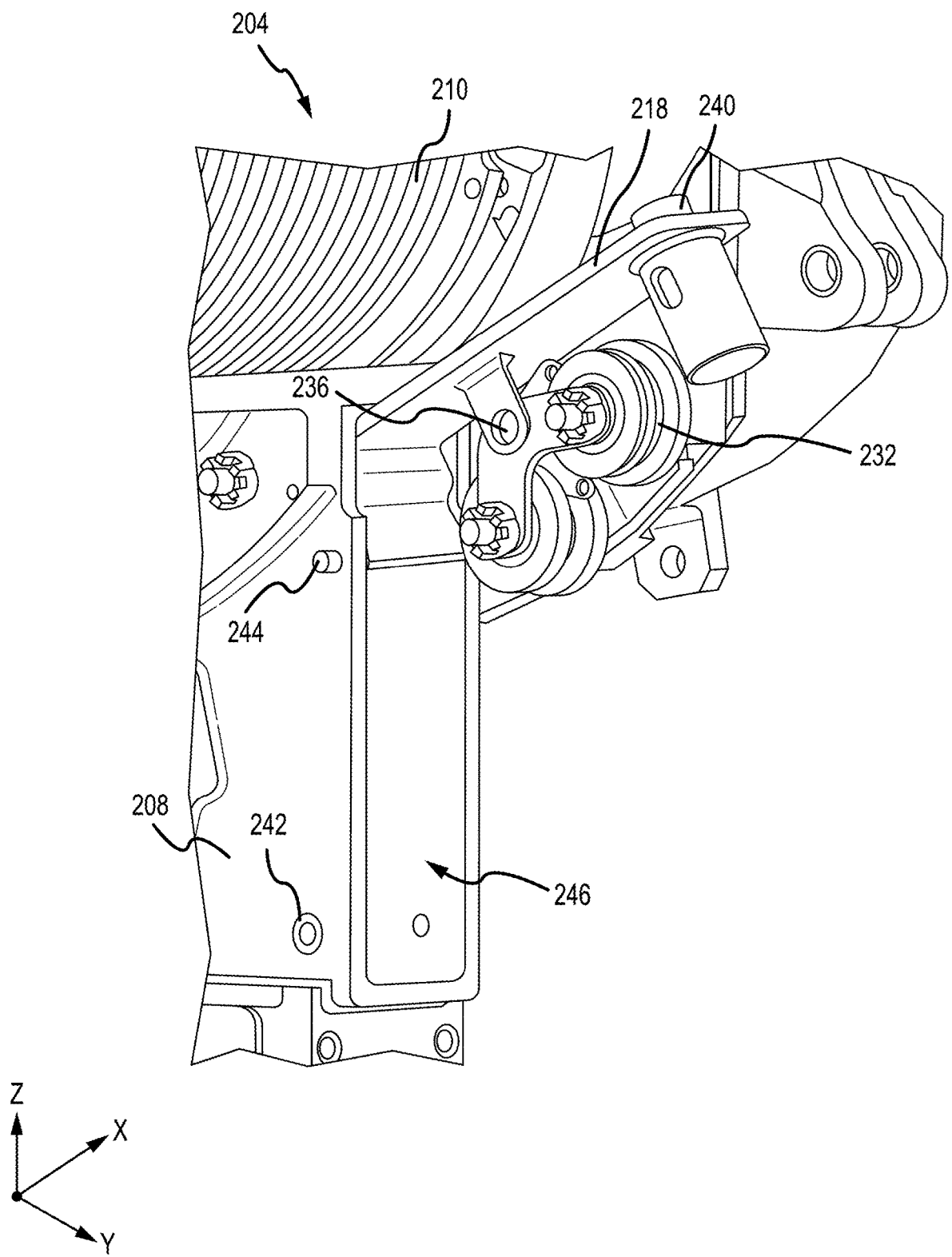

Referring now to FIGS. 3A-3C, perspective view of hoist assembly 204 are illustrated, in accordance with various embodiments. FIG. 3A illustrates hoist assembly 204 with a pin 244 securing cable follower 216 in the closed position. FIG. 3B illustrates hoist assembly 204 with pin 244 removed and cable follower 216 in the closed position. FIG. 3C illustrates hoist assembly 204 with pin 244 removed and cable follower 216 in the open position.

Referring to FIG. 3A, cable follower 216 is in a closed position with button 240 depressed and spring 238 preloaded, cable follower 216 being secured by pin 244 extending through pin hole 242. That is, when button 240 is depressed spring 238 is compressed, or preloaded. Pin hole 242 extends through housing 208 and spring housing 222, preventing spring 238 from extending. Accordingly, pin 244 secures spring housing 222 in the engage position and cable follower 216 in the closed position. The force of loaded spring 238 applies a force to pin 244, generating friction between pin 244 and pin hole 242, helping to prevent pin 244 from unintentionally falling out pin hole 242. In various embodiments, pin 244 may further include spring loaded ball bearings to secure pin 244 in place. To remove pin 244, button 240 is depressed, compressing spring 238 and releasing force on pin 244. Pin 244 may then be pulled out of pin hole 242 (e.g., in the X direction). In various embodiments, pin 244 may be a ball-lock quick release pin to secure pin 244 in place. In various embodiments, pin 244 may be include a bolt and a nut to secure pin 244 in place.

Referring to FIG. 3B, cable follower 216 is illustrated in the closed position with button 240 extended, spring 238 uncompressed, and pin 244 removed from pin hole 242. As illustrated, cable follower 216 is able to be opened by rotating out upward (e.g., the Z direction). In various embodiments, sides 240a of button 240 may be a first color (e.g., red) that is different than a second color (e.g., black) of face 240b of button 240. The difference in colors provides an indication that button 240 is not depressed and therefore cable follower 216 is not secured in the closed position.

Referring to FIG. 3C, cable follower 216 is illustrated in the open position with pin 244 inserted into pin hole 228 and catch 226 engaging pin 244 to support cable follower 216 in the open position. With cable follower 216 in the open position, cable 206 may be accessed through an opening 246. In various embodiments, spring loaded ball bearings in pin 244 secure pin 244 in pin hole 228 while cable follower 216 is in the open position.

Figure 4:
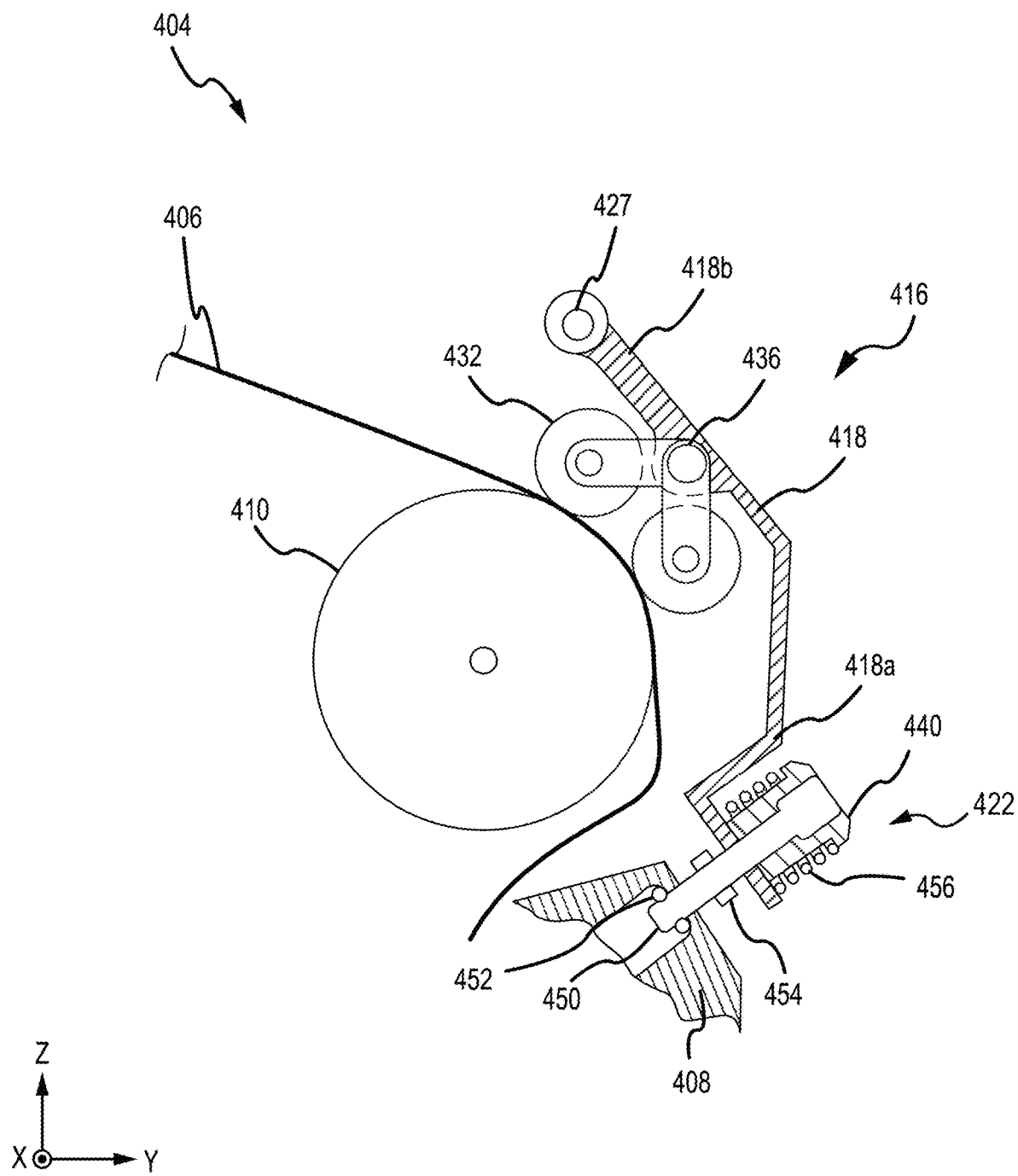
FIG. 4 illustrates a cable follower assembly for use with a hoist, in accordance with various embodiments.

Referring now to FIG. 4, a side view of a hoist assembly 404 including a cable follower 416 is illustrated, in accordance with various embodiments. Hoist assembly 404 and cable follower 416 include similar components to those described above with respect to hoist assembly 204 and cable follower 216 referenced in FIGS. 2A, 2B, and 3A-3C, including cable 406, housing 408, and drum 410.

Cable follower 416 further includes a lever 418, one or more roller wheels 432, a pivot pin 427, and a button assembly 422. Lever 418 has a first end 418a and a second end 418b. Roller wheels 432 are connected lever 418 at pivot point 436 between first end 418a and second end 418b. In various embodiments, lever 418 may be a straight lever similar to lever 218 described above. In various embodiments, lever 418 may be angled, including two or more pieces coupled together as illustrated in FIG. 4. There are advantages to both approaches, including increased mechanical force, fit with hoist assembly 404, and more specifically housing 408, and strength of materials.

Button assembly 422 includes a button 440, a pin 450, and a compression spring 456. Pin 450 may include a retaining sleeve 454 disposed along pin 450 and between lever 418 and housing 408 and one or more spring-loaded ball bearings 452 configured to engage housing 408 and secure pin 450. Similar to button 240 described above, button 440 may be pressed to compress spring 456 and press pin 450 into housing 408 as illustrated in FIG. 4. By so doing, spring 456 exerts a force on lever 418 that is translated to roller wheels 432 which in turn exert a force on cable 406, ensuring that cable 406 winds and unwinds properly regardless of whether a load is present. In various embodiments, the design and shape of lever 418 may provide a mechanical advantage allowing for the use of a smaller spring 456 while providing a similar force on cable 406 at roller wheels 432.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A cable follower, comprising:
    a lever having a first end and a second end;
    a catch disposed at the first end of the lever, the catch configured to support the lever in an open position;
    a pivot point disposed at the first end of the lever, the lever configured to rotate about the pivot point;
    a spring housing disposed at the second end of the lever;
    a spring disposed in the spring housing and configured to apply a first force on the lever, the first force acting a first direction;
    a button disposed in the spring housing and adjacent the spring; and
    a crowder coupled to the lever at a pivot point between the first end and the second end of the lever and configured to apply a second force in a second direction, the second direction being opposite the first direction, the crowder including a wheel.

2. The cable follower of claim 1, wherein the second force is greater than the first force.

3. The cable follower of claim 2, further comprising:
    a pin configured to extend through a pin hole in the spring housing.

4. The cable follower of claim 3, wherein the button is configured to compress the spring and the pin, when inserted through the pin hole, is configured to secure the spring in a compressed state.

5. The cable follower of claim 1, wherein the lever includes a bend.

6. The cable follower of claim 1, wherein the spring is further disposed within the button.

7. A hoist system, comprising:
    a hoist body having a first pin hole and a third pin hole;
    a cable drum disposed within the hoist body;
    a pulley disposed adjacent the cable drum;
    a cable disposed around the cable drum and the pulley, the cable configured to extend from the cable drum and over the pulley, the cable configured to retract over the pulley and onto the cable drum;
    a cable follower coupled to the hoist body, including:
        a member having a first end and a second end;
        a spring housing coupled to the first end of the member and having a second pin hole, wherein the first pin hole and the second pin hole are aligned when the cable follower is in a closed position;
        a first pivot point disposed at the first end of the member;
        a catch coupled to the member;
        a spring coupled to the spring housing;
        a button coupled to the spring housing and contacting the spring; and
        a crowder coupled to the member at a point between the first end and the second end, the crowder configured to apply a first force to the cable; and
    a pin, wherein the pin is configured to extend through the first pin hole and the second pin hole to secure the cable follower in the closed position, wherein the third pin hole is adjacent the first end of the member, and wherein the pin is configured to be inserted through the third pin hole and engage to the catch to support the cable follower in an open position.

8. The hoist system of claim 7, wherein the button is configured to compress the spring in response to being pressed, and wherein the pin is configured to secure the spring in a compressed state.

9. The hoist system of claim 7, wherein the catch extends perpendicular from the member into the hoist body.

10. The hoist system of claim 7, wherein the spring is configured to apply a second force to the member, the second force being less than the first force.

11. The hoist system of claim 7, wherein the crowder includes a wheel configured to engage the cable.

12. The hoist system of claim 7, wherein the member includes a first portion extending in a first direction and a second portion extending in a second direction that is different than the first direction.

13. The hoist system of claim 7, wherein the cable follower is configured to rotate with respect to the hoist body about the first pivot point to an open position such that the cable is accessible within the hoist body.

14. A method of using a cable follower with a hoist, comprising:

closing the cable follower, the cable follower including a crowder, a spring, and a button, the cable follower engaging a cable within the hoist in response to being closed;

depressing the button, the button compressing the spring;

inserting a pin through a first hole in the cable follower and a second hole in the hoist, the pin securing the compressed spring;

opening the cable follower, the cable follower further including a lever and a catch, the lever having a first end and a second end, and the catch being disposed at the first end; and inserting a pin through a third hole in the hoist to engage to the catch to support the cable follower in an open position, the third hole adjacent the first end of the lever.

15. The method of claim 14, further comprising:

depressing the button, the button compressing the spring;

removing the pin from the first hole, releasing the cable follower from the hoist; and raising the cable follower to access the hoist.

\* \* \* \* \*